(12) United States Patent
Boertlein et al.

(10) Patent No.: US 12,606,300 B2
(45) Date of Patent: Apr. 21, 2026

(54) VERTICAL TAKE-OFF AND LANDING AIRCRAFT

(71) Applicant: Method Aeronautics, LLC, Falls Church, VA (US)

(72) Inventors: Neil Boertlein, McLean, VA (US); Daniel Hatfield, Arlington, VA (US); Jeremy Novara, Falls Church, VA (US)

(73) Assignee: Method Aeronautics, LLC, Falls Church, VA (US)

( * ) Notice: Subject to any disclaimer, the term of this patent is extended or adjusted under 35 U.S.C. 154(b) by 176 days.

(21) Appl. No.: 18/747,187

(22) Filed: Jun. 18, 2024

(65) Prior Publication Data

US 2026/0042535 A1      Feb. 12, 2026

Related U.S. Application Data

(60) Provisional application No. 63/508,989, filed on Jun. 19, 2023.

(51) Int. Cl.
| | |
|---|---|
| *B64C 29/00* | (2006.01) |
| *B64C 3/54* | (2006.01) |
| *B64C 5/10* | (2006.01) |
| *B64C 25/40* | (2006.01) |
| *B64D 27/18* | (2006.01) |

(52) U.S. Cl.
CPC ............ *B64C 29/0025* (2013.01); *B64C 3/54* (2013.01); *B64C 5/10* (2013.01); *B64C 25/40* (2013.01); *B64D 27/18* (2013.01)

(58) Field of Classification Search
CPC ......... B64C 29/0025; B64C 3/54; B64C 5/10; B64C 25/40; B64D 27/18
See application file for complete search history.

(56) References Cited

U.S. PATENT DOCUMENTS

| | | |
|---|---|---|
| 3,223,354 A | 12/1965 | Seibold et al. |
| 10,029,785 B2 | 7/2018 | Niedzballa |
| 11,447,246 B2 | 9/2022 | Kunz et al. |
| 11,485,488 B1 | 11/2022 | Armer et al. |
| 11,535,366 B2 | 12/2022 | Thalheimer |

(Continued)

FOREIGN PATENT DOCUMENTS

| | | |
|---|---|---|
| CN | 107336833 A | 11/2017 |
| CN | 216443785 U | 5/2022 |

(Continued)

OTHER PUBLICATIONS

International Search Report and Written Opinion for Application No. PCT/US2024/034530 dated Oct. 1, 2024 (16 pages).

(Continued)

*Primary Examiner* — Valentina Xavier
(74) *Attorney, Agent, or Firm* — Michael Best & Friedrich LLP

(57) ABSTRACT

A VTOL aircraft includes a pod having a pod forward portion and a pod aft portion. The pod forward portion is connected to an inboard wing of the VTOL aircraft and the pod aft portion is connected to an outboard wing and a vertical stabilizer of the VTOL aircraft. The pod aft portion rotates, together with the outboard wing and the vertical stabilizer, about a centerline of the pod relative to the pod forward portion.

20 Claims, 4 Drawing Sheets

(56) References Cited

U.S. PATENT DOCUMENTS

| | | | |
|---|---|---|---|
| 11,691,725 | B2 | 7/2023 | Ivans et al. |
| 11,767,111 | B1 | 9/2023 | Blake et al. |
| 11,919,630 | B2* | 3/2024 | Baity ..................... B64U 50/13 |
| 11,939,050 | B2* | 3/2024 | Morris ................ B64C 29/0033 |
| 11,945,576 | B2 | 4/2024 | Tighe et al. |
| 12,246,819 | B1* | 3/2025 | Groninga ................ B64C 15/12 |
| 2012/0091257 | A1 | 4/2012 | Wolff et al. |
| 2012/0261523 | A1* | 10/2012 | Shaw .................. B64C 29/0033 |
| | | | 244/7 R |
| 2016/0144957 | A1 | 5/2016 | Claridge et al. |
| 2018/0057159 | A1 | 3/2018 | Ivans et al. |
| 2018/0339761 | A1* | 11/2018 | McCullough ............. B64C 5/10 |
| 2019/0127056 | A1* | 5/2019 | Weekes ............... B64C 29/0025 |
| 2019/0329863 | A1 | 10/2019 | King et al. |
| 2020/0070968 | A1 | 3/2020 | Prager et al. |
| 2020/0164993 | A1* | 5/2020 | Bevirt ..................... B64C 11/28 |
| 2021/0107640 | A1 | 4/2021 | Baity et al. |
| 2021/0276704 | A1 | 9/2021 | Pantalone et al. |
| 2022/0242557 | A1 | 8/2022 | Knoll et al. |
| 2023/0067713 | A1 | 3/2023 | Burns et al. |
| 2024/0208642 | A1 | 6/2024 | Phillips et al. |
| 2024/0383604 | A1* | 11/2024 | Marshman ............. B65D 33/14 |
| 2025/0083806 | A1 | 3/2025 | Abramov et al. |

FOREIGN PATENT DOCUMENTS

| | | |
|---|---|---|
| CN | 117360811 A | 1/2024 |
| WO | 2019109622 A1 | 6/2019 |
| WO | 2019190263 A1 | 10/2019 |

OTHER PUBLICATIONS

International Search Report and Written Opinion for Application No. PCT/US2024/034538 dated May 29, 2025 (8 pages).
U.S. Appl. No. 18/747,125, filed Jun. 18, 2024, by Boertlein et al. (Copy not submitted herewith pursuant to the waiver of 37 C.F. R. § 1.98(a)(2)(iii) issued by the Office on Oct. 19, 2004).
Bell Boeing V22 Brochure. Released in 2017. 2 pages.

* cited by examiner

VERTICAL TAKE-OFF AND LANDING AIRCRAFT

CROSS-REFERENCE TO RELATED APPLICATIONS

This application claims priority to U.S. provisional patent application No. 63/508,989, filed Jun. 19, 2023, the entire contents of which are incorporated herein by reference.

BACKGROUND

The present disclosure relates to an aircraft capable of being used as a vertical take-off and landing (VTOL) aircraft, and more specifically to a VTOL aircraft with significant range and endurance requirements.

SUMMARY

In a first aspect, which may be combined with any other aspect, an aircraft includes a fuselage, a first pod, a second pod, a first inboard wing, a second inboard wing, a first outboard wing, a second outboard wing, a first vertical stabilizer, and a second vertical stabilizer. The first pod includes a first pod forward portion and a first pod aft portion. The second pod includes a second pod forward portion and a second pod aft portion. The first inboard wing connects the fuselage to the first pod forward portion and the second inboard wing connects the fuselage to the second pod forward portion. The first outboard wing is connected to the first pod aft portion and the second outboard wing is connected to the second pod aft portion. The first vertical stabilizer is connected to the first pod aft portion and the second vertical stabilizer is connected to the second pod aft portion. The first pod aft portion rotates, concurrent with the first outboard wing and the first vertical stabilizer, relative to the first pod forward portion and the second pod aft portion rotates, concurrent with the second outboard wing and the second vertical stabilizer, relative to the second pod forward portion. The first and second pod aft portions thus enable the aircraft to have a large wingspan for efficiency in forward flight and a compact form for takeoff, landing, and storage.

In another aspect, which may be combined with any other aspect, a pod assembly configured for use on an aircraft includes a pod forward portion and a pod aft portion. The pod forward portion connects to an inboard wing of the aircraft and the pod aft portion connects to an outboard wing and a vertical stabilizer. The pod aft portion rotates, together with the outboard wing and the vertical stabilizer, about a centerline of the pod relative to the pod forward portion.

DETAILED DESCRIPTION

Preferred embodiments of the present disclosure are described herein with reference to the accompanying drawings. In the following description, well-known functions or constructions are not described in detail because they may obscure in unnecessary detail. As utilized herein, the term "exemplary" means serving as a non-limiting example, instance, or illustration. As utilized herein, the terms "e.g." and "for example" set off lists of one or more nonlimiting examples, instances, or illustrations.

Figure 1:
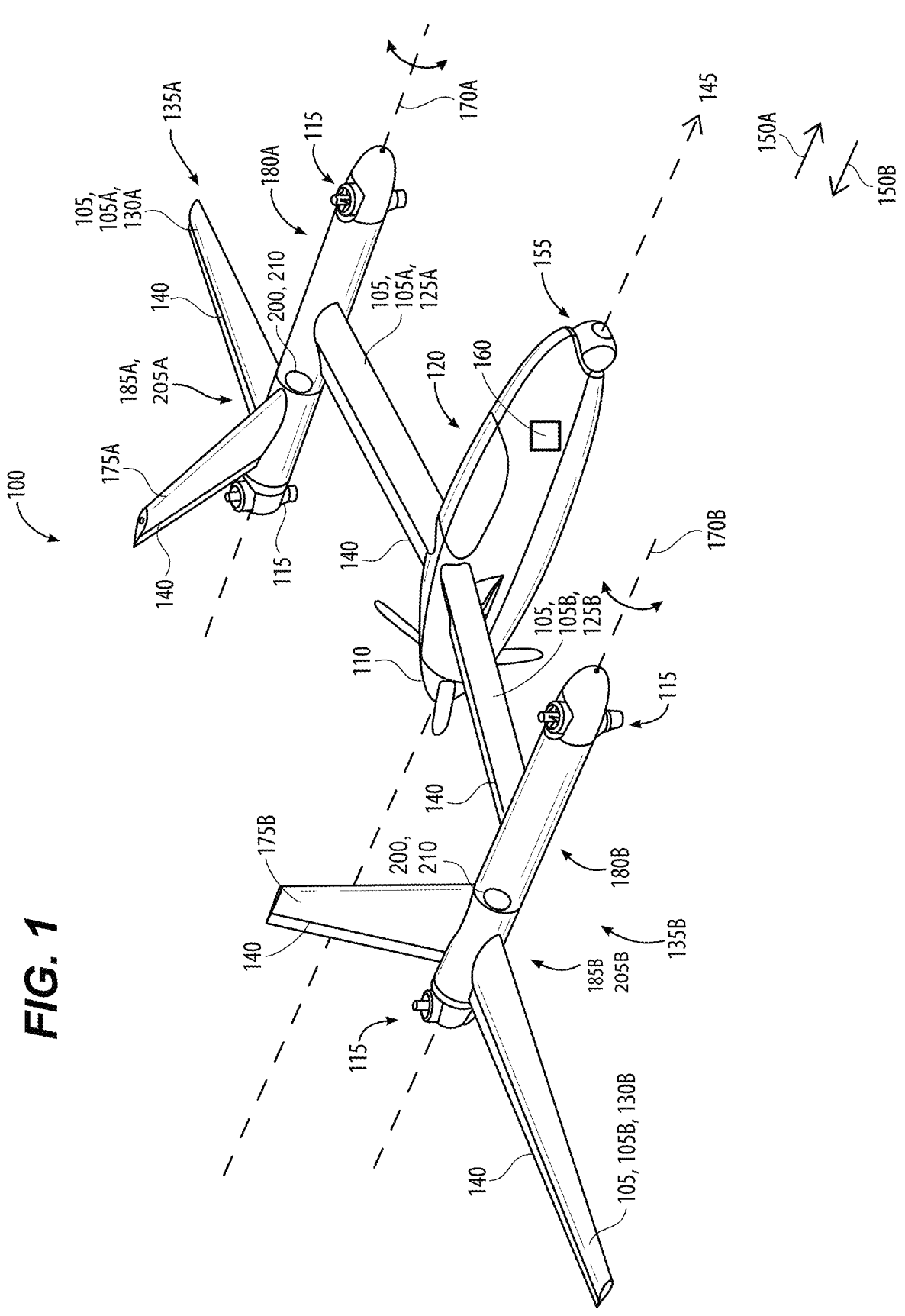
FIG. 1 illustrates a front perspective view of an aircraft.

FIGS. 1-4 illustrate different views of a vertical take-off and landing (VTOL) aircraft, i.e., aircraft 100, and more specifically illustrate an aircraft 100 with significant range and endurance requirements. The aircraft 100 in achieves relatively higher speed flight via a wing 105 and a first engine 110. The first engine 110 is a propeller operated by at least one selected from the group consisting of an internal combustion engine, a jet engine, and an electric motor, and operates the aircraft 100 at a cruise condition. As illustrated in FIG. 1, the first engine 110 is a pusher propeller. The aircraft 100 achieves vertical lift and control at hover and low airspeeds via a plurality of second engines, i.e., second engines 115. The second engines 115 are turbojet engines, turbofan engines, or ducted fan engines (together, "jet" engines) and are individually adjustable (i.e., the second engines 115 have a thrust and orientation that are adjustable independent of one another).

In some applications, a VTOL aircraft similar to the aircraft 100 employs a plurality of rotors for lift during hover and low speed, and a separate propulsion system of one or more motors dedicated to producing thrust during cruise. The lift rotors are only active during vertical take-off and landing, and the cruise propulsion system is only active during the higher-speed cruise portion of the flight. The lift rotors are typically driven by large electric motors and large banks of batteries. This makes the lift systems heavy, and the lift rotors are burdensome to store for cruise flight. In practice, the lift rotors are often first exposed during cruise flight, adding substantial drag, which reduces range, endurance, maximum speed, and climb performance. The large battery banks also create logistical and safety issues in operation. In other applications similar to the aircraft 100, a VTOL aircraft can employ one or more turbojet or turbofan engines for both vertical lift at low speeds and cruise thrust in higher-speed flight. These turbojet or turbofan engines are loud and very inefficient in cruise flight, significantly limiting the range and endurance of such aircraft. Small turbojet engines are particularly inefficient, further limiting the range and endurance achievable on smaller unmanned aircraft utilizing jet propulsion.

Long range and long endurance VTOL have many competing requirements-chief among them a desire for a large area, large span wing for efficiency in forward flight, competing against a desire for a takeoff and landing configuration which minimizes the ground area required and reduces the susceptibility of the aircraft to wind disturbances. For substantial range, endurance and payload capability, VTOL aircraft are designed with a low weight for a given lift capacity. Thus, there is a strong desire to minimize the weight of any folding mechanisms and to have aircraft components which fulfil multiple functions.

The aircraft 100 disclosed herein addresses the drawbacks of these other proposed VTOL aircraft. The aircraft 100 includes a wing 105 coupled to a fuselage 120. The fuselage 120 has the first engine 110 coupled thereto. The first engine 110 provides thrust in an axial direction 145, which is generally aligned with a longitudinal axis of the generally cylindrical fuselage 120. The axial direction 145 includes a forward direction 150A and an aft direction 150B that is opposite the forward direction 150A. As the first engine 110 is a pusher propellor, the first engine is located toward the aft direction 150B of the fuselage 120. The first engine 110 propulsion may be from an internal combustion engine, an electric motor, a turboprop engine, or a combustion/electric hybrid. Embodiments utilizing combustion engines that can run on the same fuels as the jet engines (kerosene and diesel fuels, for example) are particularly beneficial as the use of a common fuel decreases logistical requirements and increases mission flexibility.

As shown in FIG. 1, a camera 155 is located toward the forward direction 150A of the fuselage 120, i.e., at the nose of the aircraft 100. The pusher propellor layout of the first engine 110 allows for data and sensing equipment to be positioned on the forward 150A portion of the fuselage 120. The fuselage also includes other components such as a controller 160 that is configured to control operation of the first engine 110, second engines 115, and control surfaces 140, e.g., ailerons, elevons, and flaps, on the wing 105. In some examples of the aircraft 100, the controller 160 wirelessly receives signals to operate the aircraft such that the aircraft 100 is controlled in flight from a user in a location remote from the aircraft 100. In some examples, the second engines 115 are removable such that the aircraft 100 can operate as a conventional takeoff and landing aircraft.

The wing 105 includes a first wing 105A and a second wing 105B. The first wing 105A includes a first inboard wing 125A and a first outboard wing 130A connected by a first pod 135A. The second wing 105B includes a second inboard wing 125B and a second outboard wing 130B connected by a second pod 135B. In the embodiment shown in FIG. 1, the first and second inboard wings 125A, 125B are located in the forward direction 150A along the axial direction 145 relative to the first and second outboard wings 130A, 130B.

As shown in FIGS. 1-4, each of the first and second pods 135A, 135B includes two of the second engines 115. Thus, the second engines 115 are operatively coupled to the fuselage 120, but are not directly coupled to the fuselage 120. In other embodiments, as few as two of the second engines 115 are provided, i.e., one in each of the first and second pods 135A, 135B. In yet other embodiments, more of the second engines 115 are provided.

Each of the first and second pods 135A, 135B include a respective vertical stabilizer 175A, 175B. The first and second vertical stabilizers 175A, 175B both include control surfaces 140. In the embodiment shown in FIG. 1, the first vertical stabilizer 175A is located between the two second engines 115 on the first pod 135A. Likewise, the second vertical stabilizer 175B is located between the two second engines 115 located on the second pod 135B.

The second engines 115 are operatively coupled to fuselage such that each of the second engines 115 provides thrust in a direction perpendicular to the axial direction. The second engines are in this position when the aircraft 100 is taking off and landing. During takeoff and landing of the aircraft 100, the wing 105 is generally in a stall condition (i.e., at least the first inboard wing 125A and the second inboard wing 125B are in a stall condition) and provides no lift or only incidental lift. Thus, lift for the aircraft 100 is only provided by the second engines 115 during takeoff and landing.

As the aircraft 100 transitions from vertical flight during takeoff to horizontal flight (i.e., flight moving in the axial direction 145), the second engines 115 rotate toward the axial direction 145 and are each stowed within either the first pod 135A or the second pod 135B.

Together, the first engine 110 and second engines 115 provide a dynamic flight envelope for the aircraft 100. The aircraft 100 uses the first and second engines 110, 115 for lift, thrust, position control, and attitude control during vertical takeoff, vertical landing and low speed flight. Attitude and position control at low speed is performed by changing the thrust level and direction of the second engines 115. The thrust of the second engines 115 may also be directed forward 150A and aft 150B to assist in accelerating and decelerating the aircraft along the axial direction 145 through transition between low-speed and higher-speed flight. Roll, pitch and vertical velocity are controlled by varying the thrust of the second engines 115. Thrust variation in the second engines 115 may be produced by varying throttle (fuel flow), by varying the jet exit nozzle geometry, and by varying a blockage of the jet exhaust flow.

The aircraft 100 uses one or more first engines 110 for thrust during higher speed flight, with lift provided primarily the wing 105. In some embodiments, the wing 105 includes canards. Here, the term "higher-speed flight" is used to mean flight at airspeeds sufficiently above the aircraft 100 stall speed where lift and control can be safely maintained without supplementation from the second engines 115. The term "low-speed flight" is used to mean flight at airspeeds at which the wing 105 and other surfaces of the aircraft 100 do not produce substantial lift.

During transition between low-speed and higher-speed flight, lift, attitude control, velocity control and position control are provided by a combination of the low-speed and higher-speed controls. This blend of controls may vary with airspeed and with other factors such as the aircraft 100 weight, altitude and system operational adjustments. In some examples the aircraft may have eight second engines 115, operated in pairs, which may provide redundancy and improved control bandwidth.

Figure 2:
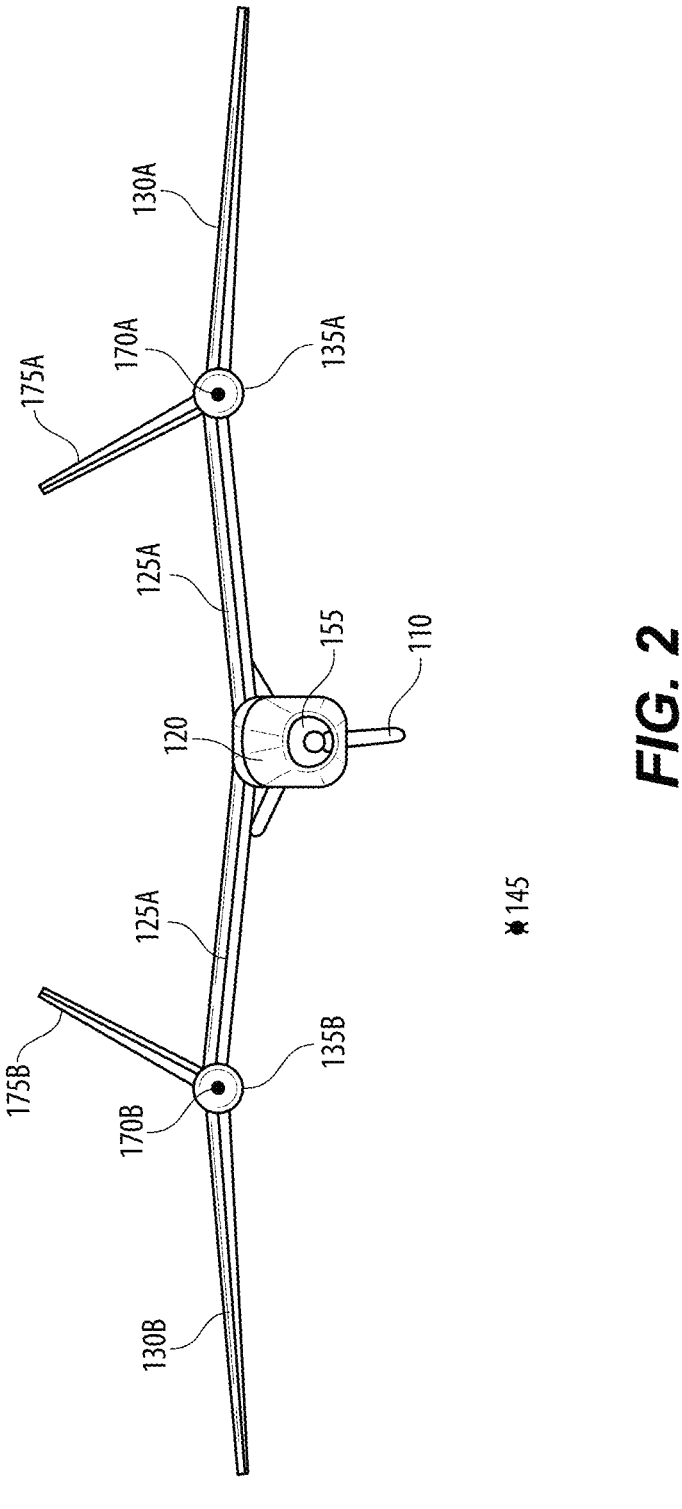
FIG. 2 illustrates a front view of the aircraft of FIG. 1.
Figure 3:
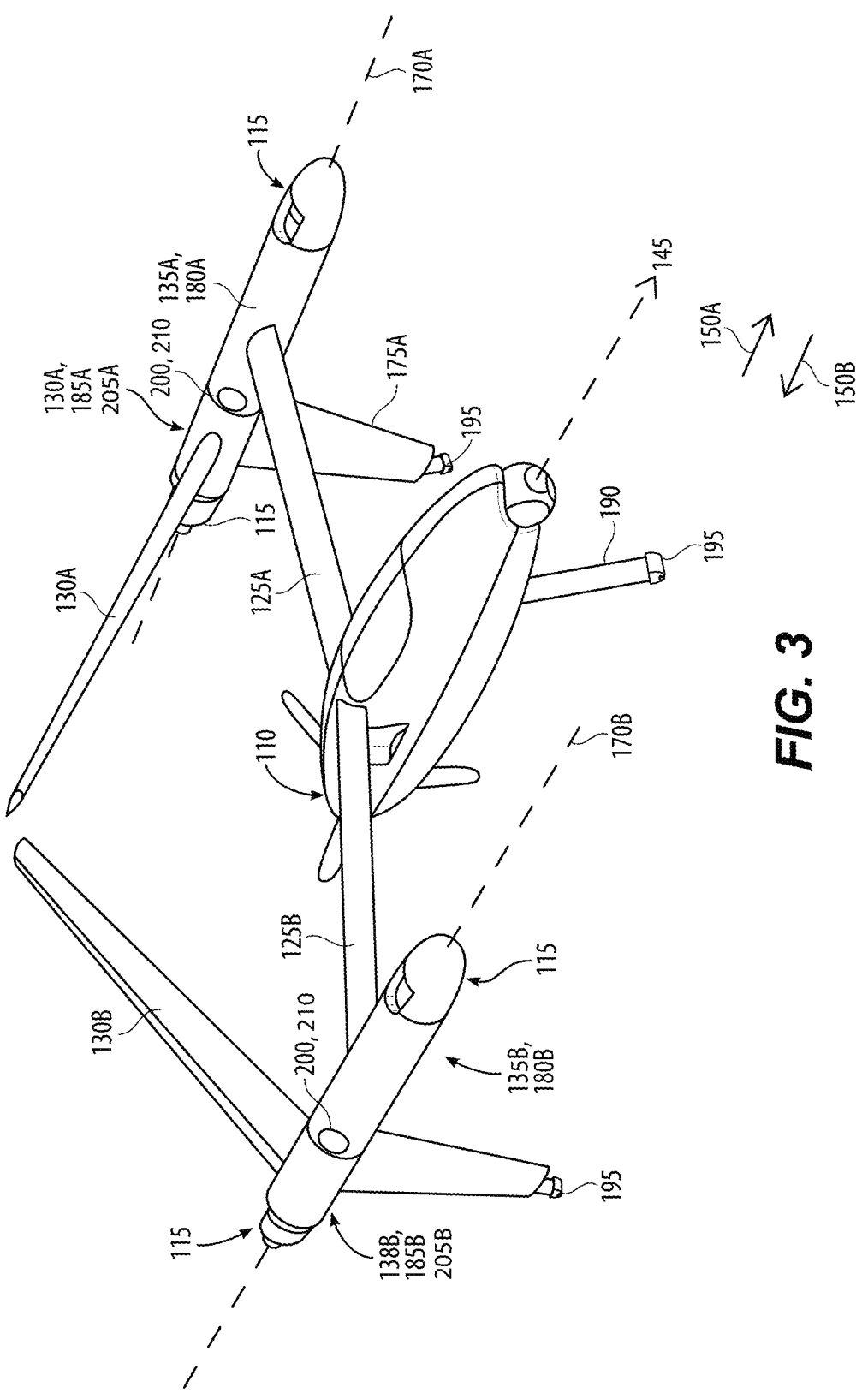
FIG. 3 illustrates a second front perspective view of the aircraft of FIG. 1.
Figure 4:
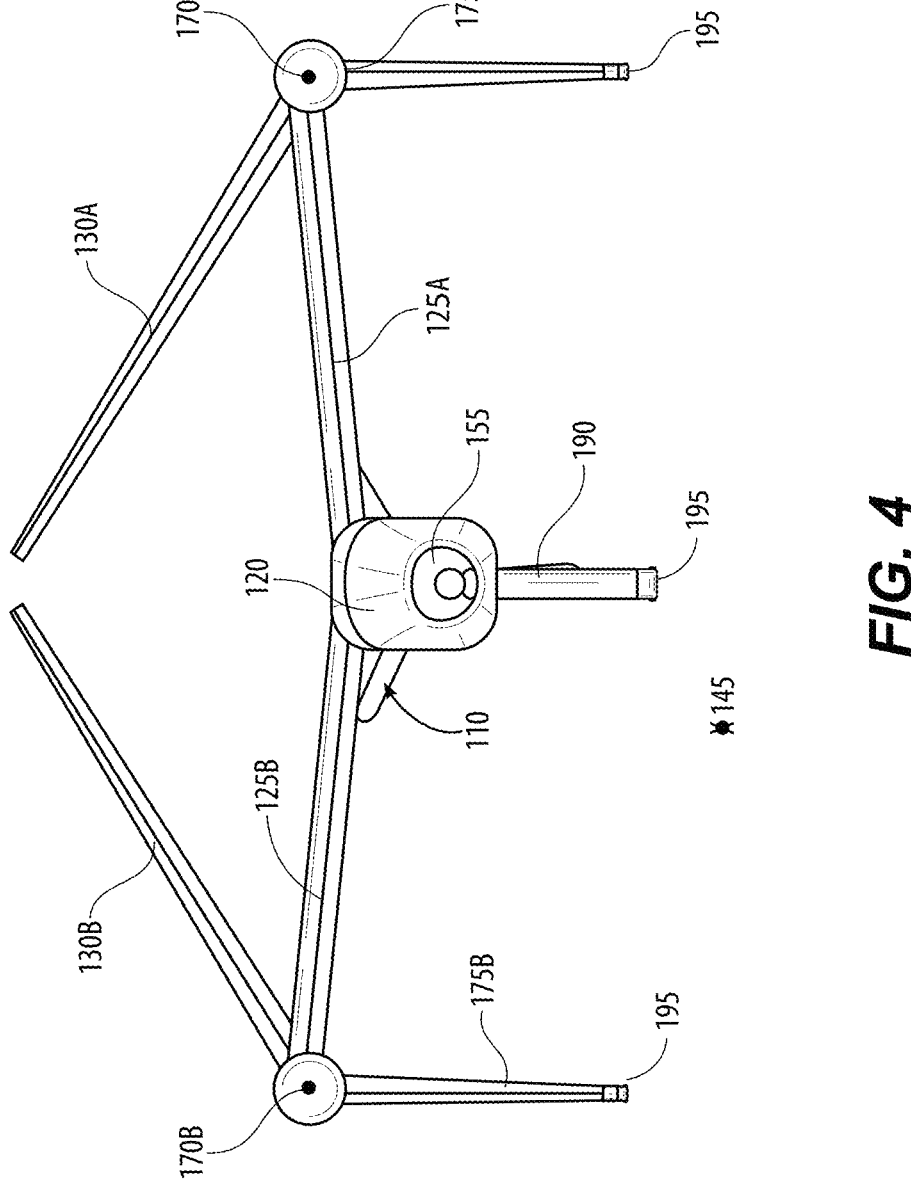
FIG. 4 illustrates a second front view of the aircraft of FIG. 1.

As best shown by comparing FIG. 1 with FIG. 3 and FIG. 2 with FIG. 4, the first pod includes a first pod forward portion 180A and a first pod aft portion 185A. The first pod aft portion 185A is rotatable, together with the first outboard wing 130A and the first vertical stabilizer 175A, relative to the first pod forward portion 180A. Further, the second pod includes a second pod forward portion 180B and a second pod aft portion 185B. The second pod aft portion 185B is rotatable, together with the second outboard wing 130B and the second vertical stabilizer 175B, relative to the second pod forward portion 180B. In some examples, the first pod 135A and second pod 135B are each an assembly that includes the respective first and second pod aft portions 185A, 185B, the first and second pod forward portions 180A, 180B, at least one of the plurality of second engines 115, the first and second vertical stabilizers 175A, 175B, and the first and second outboard wings 130A, 130B.

The rotation of the first and second pod aft portions 185A, 185B relative to the respective first and second pod forward portions 180A, 180B is used to achieve two different configurations of the aircraft 100. The first configuration, i.e., the forward flight configuration, is shown in FIGS. 1 and 2 and enables the aircraft to have a large wingspan for relatively greater efficiency in forward flight, while the second configuration, i.e., the stowed configuration, is shown in FIGS. 3 and 4 and allows the aircraft to have a compact form for takeoff, landing, and storage. The stowed configuration is used during vertical takeoff, landing, and storage of the aircraft. In the forward flight configuration, the first outboard wing 130A and the second outboard wing 130B are positioned relatively further away from the fuselage 120 than when in the stowed configuration. Further, in the forward flight configuration, the first vertical stabilizer 175A and the second vertical stabilizer 175B are positioned on an opposite side of the fuselage 120 than when in the stowed configuration. In the forward flight configuration, the first engine 110 is provides thrust along the axial direction 145 so that the aircraft 100 can achieve forward flight and travel in the axial direction. In the stowed configuration, the second engines 115 provide thrust perpendicular to the axial direction 145 so that the aircraft 100 can achieve takeoff and landing.

As shown in FIGS. 3 and 4, when the first vertical stabilizer 175A and the second vertical stabilizer 175B are in the stowed configuration, the first vertical stabilizer 175A and the second vertical stabilizer 175B are used as supports for landing the aircraft. A forward landing gear 190 is also provided, where the forward landing gear 190 is connected to the fuselage 120. The forward landing gear 190 is retractable, so that the forward landing gear 190 is stowed within the fuselage 120 when the aircraft 100 is in the forward flight configuration. Stowing the forward landing gear 190 during forward flight reduces drag and increases performance of the aircraft 100. Together, the forward landing gear 190 and the first and second vertical stabilizers 175A, 175B form a tripod for the aircraft 100 to land on and support the aircraft 100 during and after landing. As best shown in FIG. 3, the forward landing gear 190 and the first and second vertical stabilizers 175A, 175B each include shock absorbers or dampers 195 to absorb an impact from landing without causing damage to the aircraft 100. The dampers 195 may be, for example, hydraulic, pneumatic, or rubber stoppers.

Thus, when the aircraft 100 is in the forward flight configuration, the first and second outboard wings 130A, 130B are extended away from the fuselage 120 to maximize lift and the first and second vertical stabilizers 175A, 175B extend relatively perpendicular to and upwards (relative to gravity when the aircraft 100 is in level flight) from the axial direction 145. In this configuration, both the first and second inboard wings 125A, 125B and the first and second outboard wings 130A, 130B contribute to the lift and effective wing-span of the aircraft 100. The first and second outboard wings 130A, 130B need not be precisely parallel to the first and second inboard wings 125A, 125B in the forward flight configuration to meet the intent of the disclosure but instead may vary angularly within a degree range therefrom.

In the forward flight configuration, the first and second outboard wings 130A, 130B significantly reduce the drag of the aircraft 100 and the power required for flight, improving range, endurance and payload capacity. The first and second outboard wings 130A, 130B also contribute to the stability of the aircraft 100. In the forward flight configuration, the aircraft 100 generates lift over the first inboard wing 125A, the first outboard wing 130A, the second inboard wing 125B, and the second outboard wing 130B to achieve these advantages.

As best shown in FIGS. 1 and 3, the first pod 135A includes a centerline 170A about which the first pod aft portion 185A rotates relative to the first pod forward portion 180A. Further, the second pod 135B includes a centerline 170B about which the second pod aft portion 185B rotates relative to the second pod forward portion 180B. The centerline 170A of the first pod 135A and the centerline 170B of the second pod 135B are both generally parallel to the axial direction 145. To summarize, the first pod aft portion 185A and the second pod aft portion 185B rotate about the respective centerline 170A of the first pod 135A or the centerline 170B of the second pod 135B between the forward flight configuration and the stowed configuration.

As best seen in FIGS. 1 and 3, the first and second pod forward portions 180A, 180B are connected to the respective first and second inboard wings 125A, 125B. The first and second pod aft portions 185A, 185B are connected to the respective first and outboard wings 130A, 130B and the respective first and second vertical stabilizers 175A, 175B. The first and second pod aft portions 185A, 185B include respective cylindrical tubes 205A, 205B extending around at least part of the respective first and second pod forward portions 180A, 180B. The cylindrical tubes 205A, 205B of the respective first and second pod aft portions 185A, 185B and the respective first and second pod forward portions 180A, 180B are rotatable relative to one another about the respective centerline 170A, 170B. In some examples, the cylindrical tubes 205A, 205B and the respective first and second pod forward portions 180A, 180B are rotatable relative to one another more than 90 degrees about the respective centerline 170A, 170B. This range of this rotation may vary, and therefore, may be more or less than the degree range illustrated in the figures and in some embodiments can be from 90 to 180 degrees or greater than 180 degrees. In some examples, at least two of the second engines 115 are connected to the respective first or second pod 135A, 135B such that the first and second pod aft portions 185A, 185B rotate independently from the at least two second engines 115. In some examples, the cylindrical tubes 205A connect to the respective outboard wing 130A, 130B at a location greater than 90 degrees about the respective centerline 170A, 170B from where the respective first and second cylindrical tube 205A, 205B connect to the respective first and second vertical stabilizer 175A, 175B. In some examples, the first and second vertical stabilizers 175A, 175B can fold, pivot, and/or rotate, completely behind the first and second inboard wings 125A, 125B and in other examples and could overlap with each other when rotated.

The first and second pods 135A, 135B include driving mechanisms 210 for selectively rotating the first and second cylindrical tubes 205A, 205B relative to the respective first and second pod forward portions 180A, 180B. In some examples, bearings are provided between the first and second cylindrical tubes 205A, 205B and the respective first and second pod forward portions 180A, 180B. In some preferred examples, thin section angular contact and/or X-contact bearings are provided to minimize weight and maximize the diameter of the first and second pod 135A, 135B structure for the benefit of greater stiffness of the first and second pod 135A, 135B. To mechanically drive rotation of the first and second cylindrical tubes 205A, 205B, a ring gear driven by a pinion gear on a direct-drive electric motor or an electric gear motor is provided. In a preferred example, the ring gear is mounted within the respective first and second pod forward portions 180A, 180B and the pinion gear and motor are mounted within the first and second cylindrical tubes 205A, 205B. Alternatively, the ring gear is mounted within the first and second cylindrical tubes 205A, 205B and the pinion gear and motor are mounted in the respective first and second pod forward portions 180A, 180B. In some examples, if the rotation occurs at some non-zero airspeed, the control surfaces 140 may provide some or all of the torque and control required to rotate the first and second pod aft portions 185A, 185B between position for the forward-flight configuration and the stowed position.

The first and second pods 135A, 135B also include locking mechanisms 200. The locking mechanisms 200 selectively lock in place the first and second cylindrical tubes 205A, 205B relative to the respective first and second pod forward portions 180A, 180B. The locking mechanisms lock the first and second cylindrical tubes 205A, 205B in the forward flight and stowed configurations, which serve to limit loads on the driving mechanisms 210.

In some examples, the dampers 195 can be replaced with wheels so that the aircraft can use the first engine 110 to take off conventionally. In some examples, the aircraft 100 is be equipped with landing gear that allows for a jet-assisted rolling takeoff. This "short takeoff" capability may provide for an increased take-off lift capacity. The short take-off capability may be in place of or in addition to a vertical take-off capability. In some examples, the dampers 195 and wheels are not provided. In some examples, the first and second vertical stabilizers 175A, 175B act as landing gear for the aircraft when the first and second vertical stabilizers 175A, 175B are in the stowed configuration.

In any configuration, the fuselage 120, pods 135A, 135B, wing 105, and vertical stabilizers 175A, 175B may house sensors, cargo, flight control equipment, landing gear, fuel, batteries, antennas and other aircraft system and payload components as may be best conducive to the particular vehicle arrangement and mission.

The invention claimed is:

1. An aircraft comprising:
a fuselage;
a first pod including a first pod forward portion and a first pod aft portion;
a second pod including a second pod forward portion and a second pod aft portion;
a first inboard wing connecting the fuselage to the first pod forward portion;
a second inboard wing connecting the fuselage to the second pod forward portion;
a first outboard wing connected to the first pod aft portion;
a second outboard wing connected to the second pod aft portion;
a first vertical stabilizer connected to the first pod aft portion; and
a second vertical stabilizer connected to the second pod aft portion;
wherein the first pod aft portion is configured to rotate, concurrently with the first outboard wing and the first vertical stabilizer, relative to the first pod forward portion; and
wherein the second pod aft portion is configured to rotate, concurrently with the second outboard wing and the second vertical stabilizer, relative to the second pod forward portion,
the first and second pod aft portions thus enabling the aircraft to have a large wingspan for efficiency in forward flight and a compact form for takeoff, landing, and storage.

2. The aircraft of claim 1, wherein the first pod includes a centerline about which the first pod aft portion rotates relative to the first pod forward portion; and
wherein the second pod includes a centerline about which the second pod aft portion rotates relative to the second pod forward portion.

3. The aircraft of claim 2, wherein the VTOL aircraft further includes a first engine coupled to the fuselage;
wherein the first engine is configured to provide thrust in a direction generally parallel to the centerline of the first pod.

4. The aircraft of claim 3, wherein the VTOL aircraft further includes a plurality of second engines operatively coupled to the fuselage such that each second engine of the plurality of second engines is configured to provide thrust in a direction generally perpendicular to the centerline of the first pod and to rotate toward the direction generally parallel to the centerline of the first pod.

5. The aircraft of claim 4, wherein the first pod aft portion rotates about the centerline of the first pod between a forward flight configuration and a stowed configuration; and
wherein, in the forward flight configuration, the first outboard wing is positioned relatively further away from the fuselage than when in the stowed configuration.

6. The aircraft of claim 5, wherein, in the forward flight configuration, the VTOL aircraft is configured to generate lift over the first inboard wing, the first outboard wing, the second inboard wing, and the second outboard wing.

7. The aircraft of claim 6, wherein the first vertical stabilizer, the first inboard wing, and the first outboard wing all include control surfaces.

8. The aircraft of claim 5, wherein in the forward flight configuration, the first vertical stabilizer is positioned on an opposite side of the fuselage than when in the stowed configuration such that, in the stowed configuration, the first vertical stabilizer is configured to be landing gear for the aircraft.

9. The aircraft of claim 8, wherein in the stowed configuration, each second engine of the plurality of second engines is configured to provide thrust in the direction generally perpendicular to the centerline of the first pod.

10. The aircraft of claim 9, wherein the first vertical stabilizer and the second vertical stabilizer each include a damper;
wherein the fuselage includes a landing gear including a damper; and
wherein, in the stowed configuration, the dampers of the first and second vertical stabilizers and the damper of the landing gear are configured to support the VTOL aircraft when the VTOL aircraft has landed.

11. The aircraft of claim 9, wherein each second engine of the plurality of second engines is configured to provide thrust to the aircraft when the first inboard wing and the second inboard wing are both in a stall condition.

12. The aircraft of claim 11, wherein the plurality of second engines are turbojet engines that are configured to have a thrust and orientation that are both individually adjustable.

13. The aircraft of claim 12, wherein the first engine includes a pusher propeller operated by at least one selected from the group consisting of an internal combustion engine, a jet engine, and an electric motor.

14. A pod assembly configured for use on an aircraft, the pod assembly comprising:
a pod forward portion; and
a pod aft portion;
wherein the pod forward portion is configured to be connected to an inboard wing of the aircraft;
wherein the pod aft portion is configured to be connected to an outboard wing and a vertical stabilizer; and
wherein the pod aft portion is configured to rotate, together with the outboard wing and the vertical stabilizer, about a centerline of the pod relative to the pod forward portion.

15. The pod assembly of claim 14, wherein the pod aft portion includes a cylindrical tube extending around the pod forward portion; and
wherein the cylindrical tube of the pod aft portion and the pod forward portion are configured to rotate relative to one another about the centerline of the pod.

16. The pod assembly of claim 15, wherein the cylindrical tube of the pod aft portion is configured to connect to the vertical stabilizer and the outboard wing.

17. The pod assembly of claim 16, wherein the cylindrical tube of the pod aft portion is configured to selectively lock in place relative to the pod forward portion.

18. The pod assembly of claim 17, wherein the cylindrical tube of the pod aft portion and the pod forward portion are configured to rotate relative to one another more than 90 degrees about the centerline of the pod.

19. The pod assembly of claim 18, wherein the cylindrical tube of the pod aft portion is configured to connect to the outboard wing at a location greater than 90 degrees about the centerline of the pod from where the cylindrical tube of the pod aft portion is configured to connect to the vertical stabilizer.

20. The pod assembly of claim 19, further comprising (i) at least two engines connected to the pod such that the pod aft portion rotates independently from the at least two engines, (ii) the outboard wing, and (iii) the vertical stabilizer.

* * * * *